United States Patent [19]

Day et al.

[11] Patent Number: 4,708,104
[45] Date of Patent: Nov. 24, 1987

[54] REINFORCED PISTONS

[75] Inventors: Roger A. Day, Lymington; Norman Tommis, Bradford; Andrew R. Baker, Stretton-on-Dunsmore, all of England

[73] Assignee: AE Plc, Warwickshire, England

[21] Appl. No.: 22,550

[22] Filed: Mar. 3, 1987

Related U.S. Application Data

[63] Continuation of Ser. No. 665,037, Oct. 26, 1984, abandoned.

[30] Foreign Application Priority Data

Oct. 26, 1983 [GB] United Kingdom ............ 8328576

[51] Int. Cl.$^4$ ............................................. B23P 15/10
[52] U.S. Cl. .............................. 123/193 P; 29/156.5 R; 164/97; 92/254
[58] Field of Search ................. 92/211, 212, 213, 224, 92/225, 228, 248, 254, 222; 29/156.5 R; 123/193 P; 164/97

[56] References Cited

U.S. PATENT DOCUMENTS

| | | | |
|---|---|---|---|
| 4,216,682 | 8/1980 | Ban et al. | 29/156.5 R |
| 4,306,489 | 12/1981 | Driver et al. | 92/212 |
| 4,334,507 | 6/1982 | Köhnert et al. | 92/213 |
| 4,404,262 | 9/1983 | Watmough | 428/539.5 |
| 4,498,219 | 2/1985 | Ban et al. | 92/212 |
| 4,548,126 | 10/1985 | Donomoto et al. | 92/212 |

FOREIGN PATENT DOCUMENTS

| | | |
|---|---|---|
| 0018475 | 4/1979 | European Pat. Off. . |
| 0080562 | 6/1983 | European Pat. Off. . |
| 0110064 | 6/1984 | European Pat. Off. . |
| 943917 | 6/1956 | Fed. Rep. of Germany . |
| 1921211 | 2/1971 | Fed. Rep. of Germany . |
| 2089220 | 12/1971 | France . |
| WO83/01960 | 6/1983 | Japan . |
| WO79/01103 | 12/1979 | PCT Int'l Appl. . |
| 1289823 | 9/1972 | United Kingdom . |
| 0001103 | 12/1979 | United Kingdom ............ 92/211 |

Primary Examiner—Craig R. Feinberg
Assistant Examiner—David A. Okonsky
Attorney, Agent, or Firm—Leydig, Voit & Mayer

[57] ABSTRACT

A piston is manufactured by incorporating a reinforcement which is formed at least in part by a fibre material and which is so non-uniform as to provide differing characteristics in the cast piston in predetermined differing regions of the piston. For example, the volumetric density of the fibres may be different in one region of the reinforcement as compared with another region in order to produce a more resistant region in the cast piston. Additionally or alternatively, the reinforcement may hold finely divided materials which combine with the piston material during casting to give improved properties. Examples of this are the incorporation of particles of silicon, silicon carbide or silicon nitride to improve wear and/or the incorporation of molybdenum disulphide and tungsten disulphide or graphite to improve lubrication.

17 Claims, 7 Drawing Figures

REINFORCED PISTONS

This application is a continuation of application Ser. No. 665,037, filed Oct. 26, 1984, now abandoned.

BACKGROUND OF THE INVENTION

1. Field of the Invention

The invention relates to the reinforcement of pistons for internal combustion engines.

2. Review of the Prior Art

It has been common for many years to manufacture such pistons from light metals such as aluminium, aluminium alloys or magnesium alloys. This has the advantage that the mass and inertia of the piston is reduced. However, many of these metals are not readily able to withstand the conditions encountered in operation. For example, in diesel engines, the temperatures encountered by the crown of the piston may be sufficiently high to crack such lightweight materials. The crown may also be eroded by the combustion gases. In addition, the ferrous piston rings which are commonly carried in piston ring grooves in such pistons are liable to wear the piston ring grooves. Wear can also occur in the piston gudgeon pin bores of such pistons and the strength of aluminium and aluminium alloys may not be sufficient to withstand the operational stresses encountered in other regions such as expansion slots.

For this reason, it has been proposed to reinforce various regions of light metal pistons so that they are better able to withstand such adverse conditions. For example, it has been proposed to provide pistons with ceramic crowns able to withstand more elevated temperatures than the light metals and to provide piston ring grooves with ferrous reinforcements.

Where the piston is manufactured by a squeeze casting process, in which molten piston metal is placed in a mould and is then solidified under high pressure, use has been made of a reinforcement formed of fibres, for example fibres of aluminium oxide, arranged in a uniform mass. Such a reinforcement is placed in the mould before casting and the pressure applied during solidification forces the molten metal into the voids formed by the fibres so that, on solidification, the reinforcement is incorporated into the piston.

It is a problem, however, different regions of a piston require different reinforcements. For example, the piston ring groove region may require reinforcement against wear while the crown requires reinforcement against the effects of elevated temperatures and gas erosion effects.

SUMMARY OF THE INVENTION

According to a first aspect of the invention, there is provided a method of manufacturing a reinforced piston for an engine or compressor and comprising filling with molten piston metal, a mould containing a reinforcement composed at least in part of fibres, and then solidifying the molten metal under pressure, the composition of the reinforcement being so non-uniform that the reinforcement produces required differing characteristics in the cast piston in respective predetermined different regions of the piston.

According to a second aspect of the invention, there is provided a piston for an engine or compressor, made by a squeeze casting process and including a reinforcement formed at least in part of fibres, the composition of the reinforcement being so non-uniform that the reinforcement produces required differing characteristics in predetermined differing regions of the piston.

According to a third aspect of the invention, there is provided a reinforcement for incorporation in a piston for an engine or compressor in a squeeze casting process, the reinforcement, being composed at least in part of fibres and the composition being so non-uniform that the reinforcement produces required differing characteristics in the cast piston in predetermined differing regions of the piston.

BRIEF DESCRIPTION OF THE DRAWINGS

The following is a more detailed description of some embodiments of the invention, by way of example, reference being made to the accompanying drawings in which.

DESCRIPTION OF THE PREFERRED EMBODIMENTS

Figure 1:
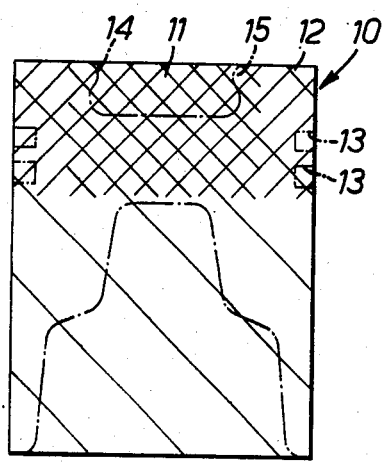
FIG. 1 is a schematic cross-section of a casting for forming a first piston and having a reinforced crown and piston ring grooves, with the crown being reinforced to a greater extent than the piston ring grooves.

Referring first to FIG. 1, the piston (which may be a piston for a Diesel engine) is manufactured in the following way. First, a generally cylindrical reinforcement 10 is prepared from fibres. The fibres may be of any suitable composition amongst which are the following:

| Trade Name | Composition |
|---|---|
| Saffil | $Al_2O_3$ |
| Nicalon | SiC (W based) |
| Silag Inc. | SiC (whiskers) |
| Grafil | C (fibres) |
| 'E' Glass | $SiO_2CAOAl_2O_3B_2O_3$ |
| Nitrisil | $Si_3N_4$ (whiskers) |
| St. Steel | Fe18%CR8%Ni2.5%Mo |
| Kaowool | $Al_2O_3SiO_2$ |

The reinforcement 10 may be prepared in any suitable way, for example by the techniques described in British Patent Application No. 83.01320. The fibres are arranged, however, so that the volume percentage of fibers in the reinforcement is greater in a central region 11 of the reinforcement and less in an outer circumferential region 12 of the reinforcement. For example, in the inner region 11, the volume percentage of fibres may be 20 to 25% while in the outer region 12 the volume percentage of fibres may be 1 to 10%.

As an alternative (see FIG. 2), the reinforcement 10 can be shaped in the form of an annulus having an inwardly directed flange 10a containing a higher volume percentage of fibres and a depending limb 10b containing a lower volume percentage of fibres.

The reinforcement 10 is placed in the mould of a crown-down squeeze casting apparatus, such as the apparatus described in British Patent Application No. 83.08174. A molten lightweight metal such as aluminium or an aluminium alloy is poured into the mould, which is then closed and the metal allowed to solidify under a substantial force, for example of the order of 40 tonnes. This forces the molten metal into the voids which exist between the fibres in the reinforcement 10. Because of the magnitude of the forces, the metal penetrates both the outer region 12 and the inner region 11 without difficulty. After the metal has solidified, the piston casting is removed from the mould and is then finish machined.

The finish machining comprises the removal of material to form one, two or more piston ring grooves 13 around the crown of the piston. In addition, a combustion bowl 14 may be machined in the piston. Other piston features (not shown) may also be added and general finish machining performed.

In use, the piston reciprocates in an internal combustion engine with the piston ring grooves 13 containing cast iron, spheroidal graphite iron and/or steel piston rings (not shown). The lesser volume percentage of fibres in the piston material forming the piston ring grooves 13 ensures that whilst the strength of the piston material is enhanced to a certain degree, the amount of fibre is not sufficient to cause unacceptably high rates of wear of the piston rings. Accordingly, piston ring wear is minimised as will be groove wear. In the centre of the crown, however, the region 11 has a maximum fibre reinforcement to optimise high temperature strength, which is necessary to resist the high temperatures found in the combustion chamber. In particular, where the piston is provided with a combustion bowl 14 to provide a Diesel engine piston, the thin material is forming the entrance 15 to the combustion bowl, which is particularly susceptible to cracking, erosion and local melting under extreme temperatures existing in this region in this design of Diesel piston, is highly reinforced.

Figure 2:
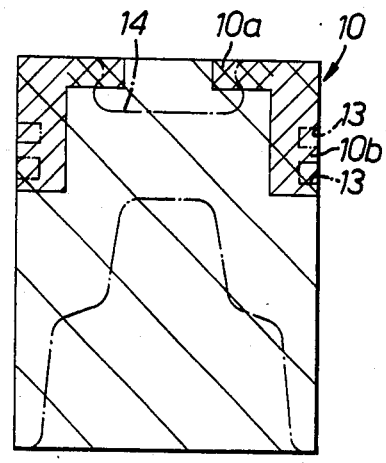
FIG. 2 is a similar view to FIG. 1 but showing an alternative form of reinforcement for producing a reinforced crown and piston ring grooves.

In the FIG. 2 alternative, the flange portion 10a reinforces the entrance 15 to the combustion bowl 14 while the limb portion 10b reinforces the piston ring grooves 13.

It will be seen, therefore, that the reinforcement provides different optimised characteristics in the finished piston in both regions.

Figure 3:
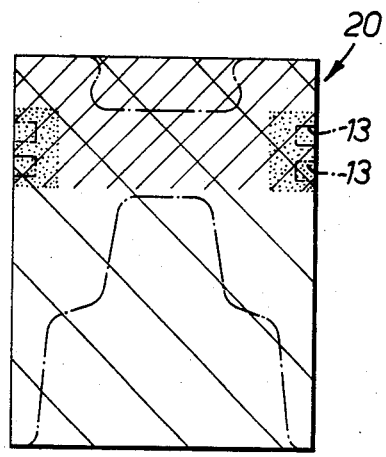
FIG. 3 is a similar view to FIG. 1 but showing a second form of piston in which the piston ring grooves are reinforced differently from the crown.

Referring next to FIG. 3, this piston is formed as follows. First, a reinforcement 20 is prepared using fibres of any of the kinds described above with reference to FIG. 1 and using the techniques described above with reference to FIG. 1. In this reinforcement 20, however, the fibres are of generally uniform volume percentage throughout the reinforcement. This volume percentage may be any suitable percentage between 1 and 25% but is preferbly in the range 15% to 20%. The fibres may be in the form of a thick wad having length and breadth and substantial thickness or in the form of a thin sheet having length and breadth but insignificant thickness.

In this embodiment, however, the outer circumferential region of the reinforcement holds a finely divided material or materials which, in combination with the piston material, will improve the properties of the piston in a piston ring groove formed in the region. Since the main problem in piston ring grooves is wear, suitable materials are those which increase the wear resistance of the piston material such as silicon, aluminium oxide, silicon oxide, silicon carbide, zirconium dioxide and graphite. In addition, materials may be provided for dispersion hardening the piston material, these materials may include, aluminium oxide, silicon carbide, silicon nitride, tungsten carbide, titanium carbide, mullite, boron carbide or any other relatively hard particulate material such as mineral powders. The quantity of finely divided material incorporated in this region is determined in accordance with usual alloying considerations, to produce an alloy of the material and the piston material having the required characteristics. The size of the particulate material may be between 0.025 $\mu$m and 1.0 $\mu$m.

For example, where the piston material is the aluminium alloy known as 'Lo-Ex', silicon may be incorporated such that, combined with the silicon already in the alloy, a region of hyper-eutetic alloy is produced. The silicon content may, in this case be such as to produce 15 to 35% by weight of silicon (1.25 to 7.25% by volume) of the material forming the piston ring grooves.

If silicon carbide is to be added to a Lo-Ex piston material, the size of the silicon carbide particles must be controlled so that no dispersion hardening can take place.

The finely divided material may be incorporated in the form of particles, a powder or grains.

Where graphite is used, there are the problems that aluminium alloys do not readily 'wet' graphite and that the dispersion of the graphite in the fibres also prevent the aluminium alloy from wetting the fibres. Inadequate wetting prevents the formation of a complete bond with the aluminium alloy on casting. To overcome this problem, the graphite may be nickel coated before incorporation into the fibres either by decomposition of nickel carbonyl on graphite particles or by the electroless deposition of nickel on graphite. The coated graphite is admixed with the fibres and the reinforcement formed.

Some other examples of suitable compositions of reinforcements are given in Table 1.

TABLE 1

| | COMPOSITIONS OF REINFORCEMENTS (all % are volume %) | |
|---|---|---|
| FIBRE | MATERIAL FOR INCREASING WEAR RESISTANCE | MATERIAL FOR DISPERSION HARDENING |
| (1) Al$_2$O$_3$ (5–15%) (3D) | Si (0–7%) Al$_2$O$_3$ (0–5%) SiO$_2$ (0–5%) SiC (0–5%) ZiO$_2$ (0–2%) Graphite (0–5%) | Al$_2$O$_3$ (3–15%) SiC (3–15%) Si$_3$N$_4$ (3–15%) SiO$_2$ (3–15%) WC (3–15%) TiC (3–15%) Mullite (3–15%) BC (3–15%) |
| (2) Al$_2$O$_3$ (2–5%) (1D) | as (1) | as (1) |
| (3) Carbon fibres (1D) | as (1) except graphite | as (1) |
| (4) 'E' Glass (1D) | Si (0–7%) Graphite (0–5%) | as (1) |
| (5) Nicalon (3–10%) (1D) | as (1) | as (1) |
| (6) Stainless | as (1) | as (1) |

TABLE 1-continued

COMPOSITIONS OF REINFORCEMENTS
(all % are volume %)

| | FIBRE | MATERIAL FOR INCREASING WEAR RESISTANCE | MATERIAL FOR DISPERSION HARDENING |
|---|---|---|---|
| | steel fibres (5-20%) (3D) | | |
| (7) | Aluminio-silicates (5-15%) (3D) | as (1) | as (1) |
| (8) | Zircal (3-8%) (1D) | as (1) | as (1) |
| (9) | Boron fibres (3-8%) (1D) | as (1) | as (1) |
| (10) | Nitrisil (1-5%) (3D) | as (1) | as (1) |

((3D) indicates that the fibres are in the form of a three-dimensional wad).
((1D) indicates that the fibres are in the form of a thin sheet which has length and breadth but insignificant thickness).

Figure 4:
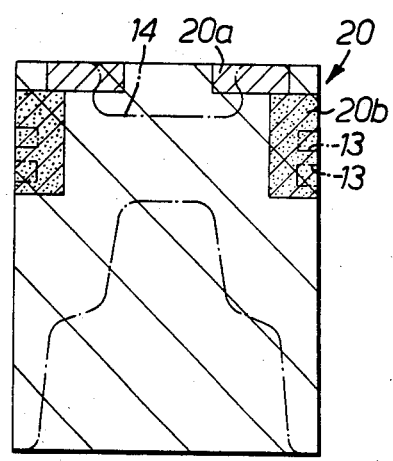
FIG. 4 is a similar view to FIG. 3 but showing the second form of piston reinforced by a two part reinforcement.

Alternatively, (see FIG. 4), the reinforcement 20 may be provided by two part-reinforcements 20a, 20b formed separately. The first part-reinforcement 20a is in the shape of a washer having length and breadth but insubstantial thickness. It is composed from the same materials as the central region of the reinforcement 20 described above with reference to FIG. 3. The second part-reinforcement 20b is in the shape of a short cylinder and is made from fibres, which may be the same as or different from the fibres of the first part-reinforcement 20a, in the manner described above. This second part-reinforcement 20b also contains any of the particulate materials or combinations of particulate materials which are described above as suitable for the circumferential region of the FIG. 3 reinforcement 20.

The reinforcement 20 described above with reference to FIG. 3 or FIG. 4, whether in one part of two, is squeeze cast into a piston casting in the same way as described above with reference to FIG. 1. As the molten piston material penetrates the reinforcement under pressure, it contacts a finely divided material held in the reinforcement and combines with it to form a region of material of modified properties. In the case of silicon, for example, a silicon hyper-eutetic alloy is formed whereas with silicon carbide a matrix of Lo-Ex containing a dispersion of particulate silicon carbide is formed. After casting, the piston ring grooves 13 are machined in the reinforced region while the other finishing steps are performed.

Figure 5:
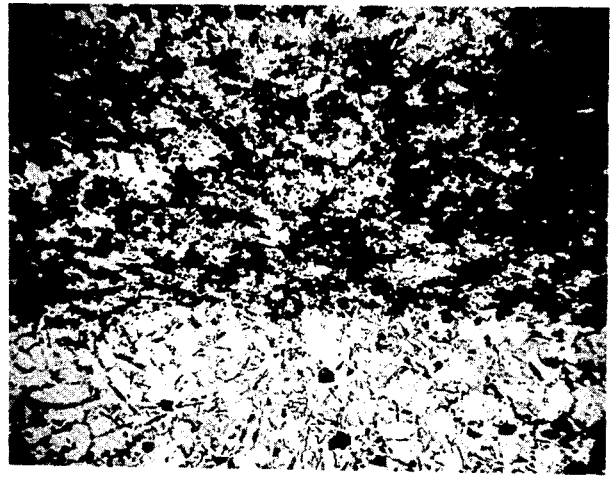
FIG. 5 is a photo-micrograph of an aluminium alloy which, in the upper portion thereof, is reinforced with aluminium oxide fibres and particulate silicon.

The photo-micrograph of FIG. 5 shows, in the upper part, an aluminium alloy reinforced by 10% by volume Saffil fibres and 10% by volume particulate silicon. As will be seen, the reinforcement is dispersed uniformly throughout the alloy to give uniform properties.

Thus, by the methods described above with reference to FIGS. 3 to 5, there is produced a piston in which the fibres reinforce the crown of the piston generally, while the piston ring grooves have particularly high wear-resistance due to the presence of the finely divided and well dispersed particulate material.

Where coated graphite is used, the nickel coating is dissolved or partially dissolved in the aluminium alloy. There is thus formed a composite which is well bounded in the aluminium alloy and which has excellent wear resistance (due to the presence of the fibres) and at the same time adequate lubricity (due to the graphite). The benefits of both materials are thus achieved.

Figure 6:
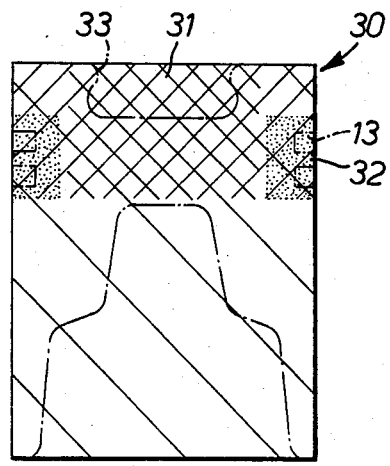
FIG. 6 is a similar view to FIGS. 1 and 2 but showing a third form of piston in which the crown and the piston ring grooves have respective differing reinforcements.

Referring next to FIG. 6, it will be seen from this Figure, that the reinforcement 30 has both a central region 31 of increased volumetric density of fibres, produced in the way described above with reference to FIG. 1, and an outer circumferential region 32 holding a particulate material, as described above with reference to FIG. 2. This reinforcement 30 is incorporated in the piston casting in the same way as described above with reference to FIGS. 1 and 2 and produces the piston having a crown, and combustion bowl 33, where such is provided, reinforced by a high density of fibres, and piston ring grooves 13 reinforced by the particulate material.

Figure 7:
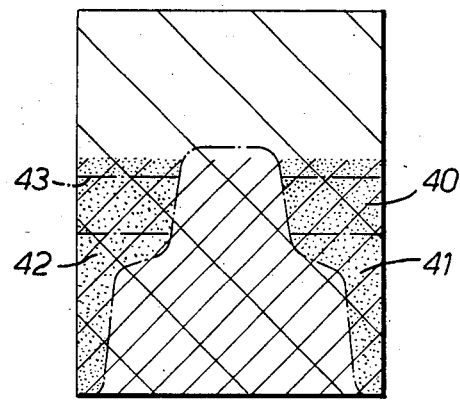
FIG. 7 is a similar view to FIGS. 1, 2 and 3 but showing a fourth form of piston in which gudgeon pin bores at the skirt of the piston are reinforced.

It will be appreciated that the variation of fibre density and/or the incorporation of finely divided materials may be applied to other regions of a piston and that the particulate material may be varied to provide other improved characteristics in the piston. For example, referring to FIG. 7, a reinforcement 40 may be prepared which reinforces the skirt of the piston and which holds, around its outer periphery, a finely divided material 42 which improves the frictional properties of the skirt surface and the interior surface of gudgeon pin bores 43 provided in the piston. The fibre reinforcement may be prepared as described above with reference to FIGS. 1 to 6, and the finely divided material may be any suitable low friction material such as molybdenum disulphide, tungsten disulphide or graphite. This reduces the frictional forces between the skirt surface and the associated cylinder or liner, when the piston is in use, and also reduces the frictional forces between the gudgeon pin bores 43 and the associated gudgeon pin.

The skirt may be reinforced, but not the gudgeon pin bores or vice versa.

We claim:

1. A method of manufacturing a reinforced piston for an engine or compressor and comprising:
    preparing a reinforcement from fibres,
    incorporating in a region of the fibre reinforcement, a finely divided particulate material, a further region not incorporating finely divided particulate material,
    inserting said reinforcement incorporating said finely divided particulate material into a mould,
    fill the mould with molten metal, and then
    solidifying the molten metal under pressure so that the molten metal penetrates said region incorporating said finely divided particulate material and said further region not incorporating a finely divided particulate material to form a piston in which said region and said further region of the reinforcement provide different characteristics in respective different regions of the piston.

2. A method according to claim 1, wherein the finely divided material is a material which forms an alloy with the piston material.

3. A method according to claim 2, in which the piston material is an aluminium alloy and wherein the finely divided material is selected from the group comprising silicon, and a silicon compound.

4. A method according to claim 1, wherein the finely divided material is a material which which forms required surface properties in a particular region or regions of the piston.

5. A method according to claim 4, wherein the material is selected from the group comprising molybdenum disulphide, tungsten disulphide or graphite in order to reduce the coefficient of friction at the surface of the region or regions.

6. A method according to claim 1, wherein an additional non-uniformity of the reinforcement is provided by a variation of the volume percentage of the fibres within the reinforcement, so that a first characteristic is provided in a region or regions of the cast piston including a higher volume percentage of fibres and a second characteristic is provided in a region or regions of the cast piston including a lower volume percentage of fibres.

7. A method according to claim 6, wherein the first and second characteristics are provided by different fibres.

8. A method according to claim 6, wherein the volume percentage of fibres is varied between 1 and 25%.

9. A method according to claim 8, wherein in the region or regions of the cast piston having said first characteristic, there is 20 to 25% by volume of fibres and in the region or regions of the cast piston having said second characteristic, there is 1 to 10% by volume of fibres.

10. A piston for an internal combustion engine or compressor comprising:
a squeeze cast piston body,
a reinforcement formed of fibres and incorporated into the squeeze cast body during the casting and having a first region incorporating a finely divided particulate material and a second region incorporating a finely divided particulate material,
a first region of the piston reinforced by said first region of said reinforcement and having first required characteristics,
a second region reinforced by said second region of the reinforcement and having required characteristics different from the characteristics of said first piston region.

11. A piston according to claim 10, wherein additional non-uniformity of the reinforcement is provided by variation of the volume percentage of the fibres so that a first characteristic is provided in a region or regions of the piston including a higher volume percentage of fibres and a second characteristic is provided in a region or regions of the piston including lower volume percentage of fibres.

12. A piston according to claim 11, wherein the piston includes a crown and piston ring grooves, the reinforcement reinforcing both the crown and the piston ring grooves and having a greater volume percentage of fibres in the crown region than the piston ring groove region.

13. A piston according to claim 10, wherein the piston includes a crown portion and a piston ring groove portion and the reinforcement reinforces both portions, the reinforcement including a finely divided material for improving the properties of at least one of said portions.

14. A piston according to claim 13, wherein the piston has a piston ring band and a skirt, the reinforcement extending to these regions and including a particulate material which forms a surface having a lower coefficient of friction with an associated cylinder or liner than the unreinforced piston metal.

15. A reinforcement for incorporation in a piston for an engine or compressor in a squeeze casting process, the reinforcement being composed of fibres and having a first region incorporating a finely divided particulate material therein and a second region not incorporating finely divided material to produce required differing characteristics in the cast piston in predetermined differing regions of the piston.

16. A reinforcement according to claim 15, wherein additional non-uniformity of the reinforcement is provided by the variation in the volume percentage of the fibres so that a first characteristic is provided in a region or regions of higher volume percentage of fibres and a second characteristic is provided in a region or regions of lower volume percentage of fibres.

17. A reinforcement according to claim 16, wherein non-uniformity of the reinforcement is provided by the provision, in at least one region of the fibres, of a finely divided material which, in combination with the piston material, produces, in the corresponding region or regions of the cast piston, the required characteristics.

* * * * *